US011704265B2

(12) United States Patent
Panesar et al.

(10) Patent No.: US 11,704,265 B2
(45) Date of Patent: Jul. 18, 2023

(54) MESSAGE MONITORING

(71) Applicant: SIEMENS INDUSTRY SOFTWARE INC., Plano, TX (US)

(72) Inventors: Gajinder Panesar, Bristol (GB); Iain Robertson, Bedford (GB); Callum Stewart, Livingston (GB); Hanan Moller, Wotton-Under-Edge (GB); Melvin Cheah, Cambridge (GB)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/064,594

(22) Filed: Oct. 6, 2020

(65) Prior Publication Data

US 2021/0103537 A1 Apr. 8, 2021

(30) Foreign Application Priority Data

Oct. 7, 2019 (GB) ...................................... 1914477

(51) Int. Cl.
*G06F 13/36* (2006.01)
(52) U.S. Cl.
CPC .......... *G06F 13/36* (2013.01); *G06F 2213/40* (2013.01)
(58) Field of Classification Search
None
See application file for complete search history.

(56) References Cited

U.S. PATENT DOCUMENTS 9,300,275 B1 * 3/2016 Kumar ................... H03K 3/012
9,529,686 B1   12/2016 Arbel 2012/0254337 A1 * 10/2012 Fake .................... G06F 11/3068
                                                                  709/207
2013/0138930 A1 *  5/2013 Wilson ................ G06F 9/30087
                                                                  712/225
2014/0137231 A1 *  5/2014 Sastry ..................... G06F 21/76
                                                                   726/16

(Continued)

FOREIGN PATENT DOCUMENTS

GB      2544807 A    5/2017
WO   03090052 A2   10/2003

OTHER PUBLICATIONS

United Kingdom Search Report for UK Application No. 1914477.3 dated Jul. 21, 2020.

(Continued)

*Primary Examiner* — Elias Mamo
(74) *Attorney, Agent, or Firm* — Lempia Summerfield Katz LLC

(57) ABSTRACT

A supervisory unit configured to supervise interconnect messages passing to or from an interconnect is provided. The supervisory unit is configured to, on receiving an interconnect message: store the interconnect message in a data store; compare the interconnect message to predetermined filter criteria; and select, in dependence on that comparison, one or more actions to be taken with respect to the interconnect message. The one or more actions are selected from the group including: permitting the interconnect message to pass unaltered; blocking the interconnect message from passing and permitting the interconnect message to pass in an altered state; and performing the one or more selected actions with respect to the interconnect message.

12 Claims, 2 Drawing Sheets

(56) References Cited

U.S. PATENT DOCUMENTS

| | | | |
|---|---|---|---|
| 2015/0043575 A1* | 2/2015 | Kumar | H04L 41/0823 |
| | | | 370/390 |
| 2015/0046702 A1* | 2/2015 | Paaske | G06F 21/85 |
| | | | 713/160 |
| 2016/0180114 A1* | 6/2016 | Sastry | G06F 21/85 |
| | | | 713/189 |
| 2018/0007032 A1 | 1/2018 | Pappu | |
| 2018/0012030 A1 | 1/2018 | Litichever et al. | |
| 2019/0087359 A1 | 3/2019 | Litichever et al. | |

OTHER PUBLICATIONS

European Search Report for European Application No. 20198445.7-1218 dated Feb. 10, 2021.

* cited by examiner

MESSAGE MONITORING

This application claims the benefit of UK Patent Application No. UK 1914477.3, filed on Oct. 7, 2019, which is hereby incorporated by reference in its entirety.

BACKGROUND

The present embodiments relate to monitoring messages in a computer system.

In a typical computer system, a processor executes instructions. At least some of the instructions may be retrieved from a memory over a communications interface, conventionally a bus. Data on which the instructions are to act may be retrieved in a similar way.

There are circumstances in which the processor may attempt to execute the wrong instructions or to retrieve data from the wrong area of memory. These situations may occur when the instructions include an error, or if someone succeeds in subverting the set of instructions that the processor was intended to execute. To illustrate, if the instruction set contains an error, then the processor may start to retrieve subsequent instructions from an incorrect location. If the processor were to execute the instructions at that other location, that might cause the processor to behave wrongly. In another example, a designer may intend the processor to not access certain areas of memory, to avoid information in those areas being leaked, but if someone could corrupt some of the instructions, then the processor may be made to retrieve information from those areas.

SUMMARY AND DESCRIPTION

It would be desirable to implement measures to prevent instances such as the ones described above. This may improve the security of a computer system and also increase its reliability.

According to one aspect, a supervisory unit for supervising interconnect messages passing to or from an interconnect is provided. The supervisory unit is configured to, on receiving an interconnect message: store the interconnect message in a data store; compare the interconnect message to predetermined filter criteria; and select, in dependence on that comparison, one or more actions to be taken with respect to that interconnect message. The one or more actions are selected from the group including: permitting the interconnect message to pass unaltered; blocking the interconnect message from passing and permitting the interconnect message to pass in an altered state; and perform the selected one or more actions with respect to the interconnect message.

The interconnect may be a bus (e.g., a data bus or an instruction bus). The interconnect may be a network on chip (NoC).

The data store may be a multi-bit latching unit implemented in hardware located in a communication path for interconnect messages between the interconnect and a participant in an interconnect protocol in accordance with which the interconnect operates.

The supervisory unit may be configured to perform the actions by signaling the latching unit to release or delete a respective interconnect message.

The supervisory unit may include an external communications interface distinct from the interconnect, and the group includes transmitting a message over the external communications interface.

The interconnect may operate in accordance with an interconnect protocol, and the supervisory unit may include a comparison function for performing the comparing act. The supervisory unit may also include a translation function configured to translate the interconnect message from a format in accordance with the interconnect protocol to a translated message in a second format not in accordance with the interconnect protocol, and to provide the translated message as input to the comparison function.

The group may include changing the filter criteria.

The supervisory unit may include an external communications interface distinct from the interconnect, and the supervisory unit may be configured to permit the filter criteria to be changed in response to commands received by the supervisory unit over the external communications interface.

The supervisory unit may be implemented in dedicated hardware (e.g., including one or more processors).

The unit may be configured for supervising interconnect messages passing to an interconnect from a data processor core or to another device such as a hardware accelerator.

At least one of the filter criteria may define an interconnect message associated with a security and/or integrity risk, and the supervisory unit may be configured to, on identifying a match between that criterion and an interconnect message, take the action of blocking the interconnect message from passing or permitting the interconnect message to pass in an altered state.

The interconnect may be a memory interconnect.

In this specification, when an article is said to be configured to perform an operation, this indicates that the article is equipped with all the hardware (if any) and software (if any) needed to enable the article to carry out the respective operation, but is not necessarily powered on or set into an operational state in which the article will perform that operation.

DETAILED DESCRIPTION

In the system to be described below, a mechanism is located in a communication path between a processor and a communication bus. The bus may connect the processor to memory. The mechanism analyzes messages sent over the bus. In dependence on a result of that analysis, the mechanism may select how the message may be treated. For example, in dependence on the determination with respect to a message, the mechanism may (i) allow that message to pass over the bus, (ii) prevent that message from passing over the bus, or (iii) allow a modified version of the message (or a completely different message) to pass over the bus. This may help to improve a reliability or a security of the processor, as will be described further below.

Figure 1:
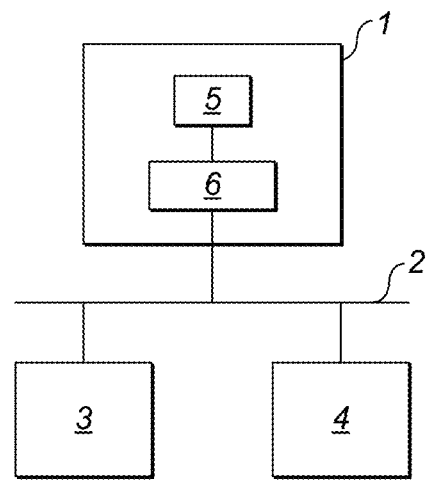
FIG. 1 is a schematic diagram of one embodiment of a computer system.

FIG. 1 shows one embodiment of a computer system including a processor 1, a communication bus 2, and memory units 3, 4. The processor 1 and the memory units 3, 4 are coupled to the communication bus 2 so that the processor 1 and the memory units 3, 4 may intercommunicate by messages carried over the communication bus 2. In one embodiment, the processor 1 is implemented on a single integrated circuit. At least one of the memory units 3, 4 may be implemented on the same integrated circuit. Alternatively, the memory units 3, 4 may be implemented on distinct devices to the processor 1: for example, one or more dedicated memory integrated circuits. The processor 1 includes a processor core 5 and a bus interface 6. The processor core 5 executes instructions. The bus interface 6 implements a suitable protocol for transmitting and receiving messages over the communication bus 2.

In typical bus protocols, units on the communication bus 2 may be allocated a set of addresses. When the unit is a memory, those addresses may be mapped on to locations in the memory. Another unit on the communication bus 2 may read from or write to an address by specifying that address in a bus transaction.

An individual bus transaction may be divided into a number of phases. The phases are typically staggered in time, so each phase does not overlap any other in time. The details of the phases may vary between protocols, but typically include an address phase at which a first unit on the bus specifies over the bus a remote address, and then a data phase at which: (a) if the transaction is a read transaction, the unit to which that remote address has been allocated returns the data at that address over the bus; or (b) if the transaction is a write transaction, the first unit transmits over the bus the data to be stored at that address, which the unit to which that address has been allocated may then store. A transaction on a bus using, for example, on chip interconnect protocols such as AXI or a variant thereof may also include a response phase.

In the system of FIG. 1, when the processor 1 wishes to read from one of the memories 3, 4, the processor 1 may initiate an interconnect transaction, and specify, over the interconnect, the address from which the processor 1 wants to read data or to which the processor 1 wants to write data. Then, the data itself may be sent over the interconnect (which may be an NoC), either to or from the processor.

Figure 2:
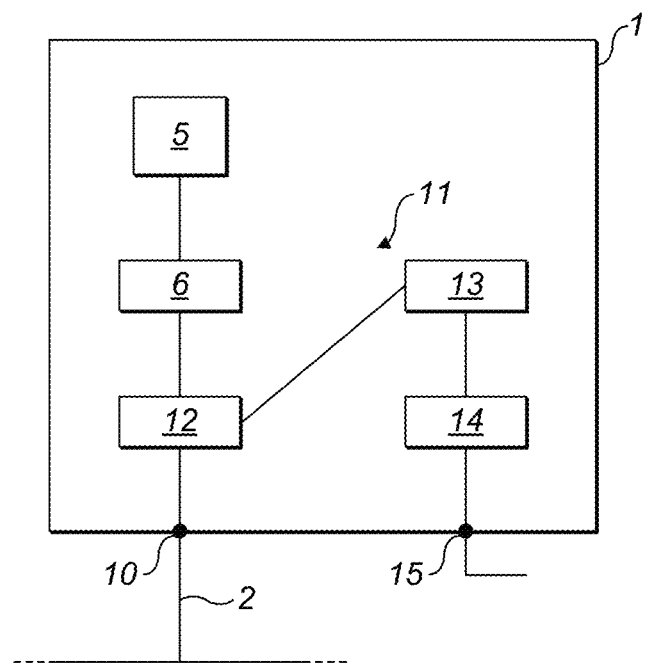
FIG. 2 shows part of the architecture of one embodiment of a processor in the computer system of FIG. 1.

FIG. 2 shows how the processor 1 may be configured to allow for the interconnect or NoC transactions of the processor 1 to be supervised. The processor 1 has a physical connection 10 to the interconnect or NoC. The physical connection 10 is at the boundary of the processor 1. In this example, a supervisory function shown generally at 11 is located between the logical bus interface 6 of the processor 1 and the physical bus connection 10 of the processor 1. In this arrangement, at least part of the supervisory function may be considered part of the processor 1. Alternatively, the supervisory function may be located between the physical interconnect of the processor 1, or the NoC connection and the interconnect or NoC 2 itself. In that case, the supervisory function may be considered to be external to the processor 1. The supervisory function includes three functional blocks: a gater 12, a transaction monitor 13, and a control interface 14. The gater 12 is located in the communication path between the logical bus interface 6 of the processor and the bus 2.

Figure 3:
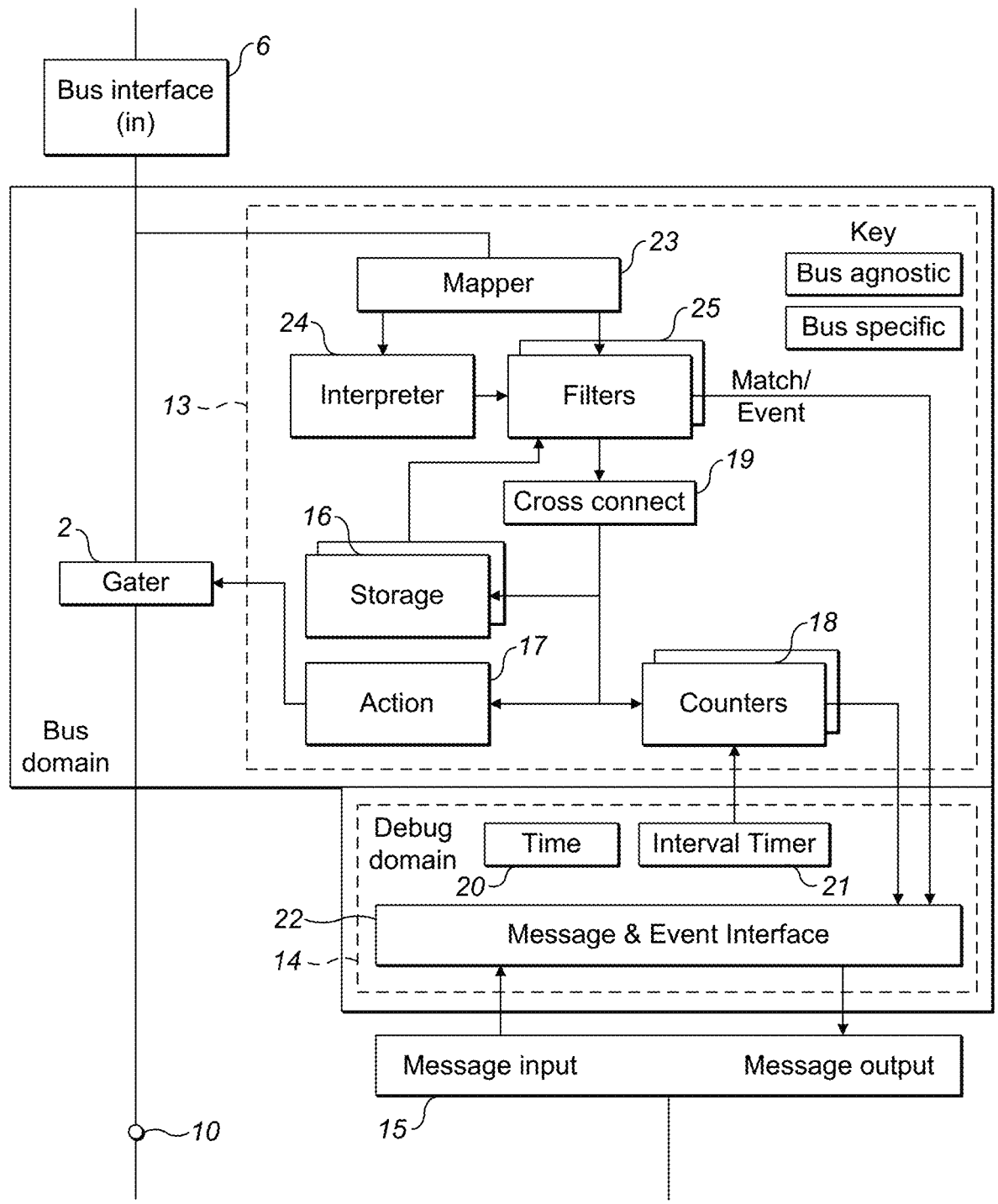
FIG. 3 shows an exemplary message interception function.

FIG. 3 shows one embodiment of the architecture of the supervisory function (e.g., a supervisory unit) in more detail. In this example, the gater 12 is located in the communication path for interconnect or NoC messages between the interconnect or NoC interface 6 of the processor 1 and the connection 10 to the physical interconnect or NoC externally of the processor 1. A mapper 23 receives communications from the bus interface 6. Outputs of the mapper pass to an interpreter 24 and a filter unit 25. One output of the filter unit 25 passes to a cross-connect unit 19. The output of the cross-connect unit 19 passes to a storage unit 16, an action unit 17, and a counter unit 18. The output of the action unit 17 passes to the gater 12. The output of the counter unit 18 and another output of the filter unit 25 pass to an event interface 22 that is part of the control interface 14. The control interface also includes a clock 20 and an interval timer 21 having an output that passes to the counter unit 18. The event interface 22 is coupled to a secondary communication interface 15. The secondary communication interface 15 allows an operator to configure the transaction monitor 13 and to receive information about operations that have been performed by the transaction monitor 13 and messages that have passed over the bus 2.

The system has been described as a set of functional blocks. The functions of the system may be split in any suitable way into any convenient number of software and/or hardware blocks. These may be the same as or different from those shown in FIG. 3.

The operation of the system will now be described. When a bus message is transmitted by the bus interface 6, the bus message is received by the gater 12 and by the mapper 23. The gater 12 holds the message and does not transmit the message onwards until the gater 12 is commanded to do so by the transaction monitor 13. The purpose of the mapper 23 is to transform the bus message into a standardized format that the remainder of the transaction monitor 13 has been set up to work with. If the transaction monitor 13 is intended to work with only a single kind of bus, then the mapper 23 may be omitted. The mapper 23 identifies predetermined features from the bus message as received by the mapper 23 and forms an output in which the identified predetermined features are presented in a predetermined format and order. By mapping messages from different buses on to that predetermined format and order, the mapper 23 may allow much of the remainder of the transaction monitor 13 to be common for different bus formats.

The mapper 23 outputs the standardized version of the received bus message to the interpreter 24 and the filter unit 25. The filter unit 25 is preconfigured with a set of bus message patterns that are intended to be subject to actions, as will be described below. That configuration may be done via the control interface 14. For clarity, data paths for configuring the units of the transaction monitor 13 from the control interface 14 are not shown in FIG. 3. For example, the filter unit 25 may be set to match messages that are directed to a predetermined subset of bus addresses or that occur within a predetermined interval (e.g., in time or number of bus messages) after a certain preceding bus message. To summarize, the following data flow, if a bus message is not matched by the filter unit 25, then the transaction monitor 13 will cause the gater 12 to release the message unchanged. If a bus message is matched by the filter unit 25, then transaction monitor 13 will cause the bus message being held by the gater 12 to be blocked, or to be modified before being released.

Storage 16 stores the patterns available to the filter unit 25. The filter unit 25 may be configured from the control interface 14.

If the filter unit 25 does not match a message against one of the pre-stored patterns of the filter unit 25, then the filter unit 25 signals the action unit 17 to cause the action unit 17 to cause the gater 12 to release the message. Then, the system may process the next message coming over the bus 2. The filter unit 25 may also cause a counter in the counter unit 18 to be incremented to indicate that a bus message has passed unchanged. The filter unit 25 may also cause an update to be made in the storage unit 16. This allows the system to change the filter conditions depending on a preceding bus message. For example, a filter condition may be set to match a message only when a predetermined number of unmatched messages have passed previously. That predetermined number may be stored in the storage 16 and then decremented when an unmatched message is received. Alternatively, a filter condition may be set to match a message that would involve the accessing of memory, or a predetermined region of memory, at greater than a predetermined frequency.

If the filter unit 25 does match a message against one of the pre-stored patterns, then the filter unit 25 signals the action unit 17 with an indication that a filter pattern has been matched for the message currently held by the gater 12. The filter unit 25 may also indicate which filter pattern has been matched. The action unit may take different action depending on which filter pattern is indicated as having been matched. The filter unit 25 may cause a counter in the counter unit 18 to be incremented to indicate that a bus message has matched a filter pattern, and optionally to indicate which filter pattern was matched. There may be a counter specific to a respective filter pattern. The filter unit 25 may also cause an update to be made to the storage unit 16. For example, in response to a bus message to a predetermined address being matched, a pattern in the filter unit 25 to match a bus message to another predetermined address may be activated or deactivated. When the filter unit 25 identifies a match between a bus message and a filter pattern, the filter unit 25 also signals a match to the message and event interface 22. This allows the control unit 14 to take additional action when the match is identified. For example, the control unit 14 may transmit a message by signaling over interface 15 to alert a user.

The action unit 17 is signaled by the filter unit 25 when a message on the bus 2 that is held at the gater 12 matches one of the patterns pre-programmed to the filter unit 25 and/or the storage 16. The action unit 17 is pre-programmed with actions that the action unit 17 may take when a match is detected. The action to be taken may be dependent on the pattern that has been matched and/or on content of the message that has been matched against that pattern (e.g., parameters in that message). Examples of actions that may be taken include: 1. Causing the gater 12 to block the message from passing to the bus 2 (e.g., the gater may delete the message); and 2. Modifying the message held at the gater 12 and then causing the gater 12 to pass the message to the bus 2. Examples of ways in which the message may be modified include changing an address specified in the message (e.g., in the case of a read or write message) or changing data specified in the message to be written to a remote location over the bus 2.

The system described above acts between a processing core of a processor and a communications bus. The bus may communicatively couple the processor core to one or more memories. The system temporarily holds messages sent from the processing core to the bus while the messages are checked against one or more predefined criteria or patterns. If a message meets none of the criteria, and/or optionally if the message meets one or more specified ones of the criteria, the system permits the message to pass unchanged to the bus. If the message meets one or more other ones of the criteria, then the system takes other action with respect to the message. For example, the message may be blocked from passing to the bus, or the message may be modified before the message passes to the bus. The criteria/patterns may be defined for various purposes. Some examples are: 1. The patterns may be defined to help the security and/or integrity of the processor (e.g., the patterns may check for and block attempts to access memory areas that should not be accessed by the processor; an operator may be alerted to any such attempt over the interface 15); 2. The patterns may be defined to help the debugging of software running on the processor (e.g., the patterns may check for specified events during the execution of such software). The events may be associated with desired or undesired behavior. An operator may be alerted to any such event over the interface 15.

Some examples of criteria/patterns that may be matched by the filter unit 25 include: 1. A message of a predetermined type (e.g., read or write) specifying an address in a predetermined range; 2. A message that is related in a predetermined way to a preceding message (e.g., specifying an address that is offset from an address specified in a preceding message by an offset in a predetermined range); 3. A write message that specifies data to be written that matches a predetermined pattern; and 4. The profile of the transactions is suspicious.

The supervisory system performs the following acts when the supervisory system receives a bus message: 1. interpreting the bus protocol; 2. identifying transactions of interest using the filter; 3. and when transactions of interest are detected, taking a predefined action in respect of such a transaction (e.g., different actions may be taken for different transactions or classes of transactions).

Examples of possible actions include: 1. allowing the transaction to proceed unmodified (e.g., with only added latency) through the gater 12; 2. blocking the transaction from proceeding further (e.g., using transaction gating); 3. modifying the transaction before allowing the transaction to proceed (e.g., using transaction gating); 4. storing some state to be used by filters in future transaction identification (e.g., using storage units); and 5. issuing a trigger (e.g., match message, real-time event, or internal trigger). This may be used by other monitoring infrastructure.

The system shown in FIG. 3 may be implemented using any suitable hardware and/or software. The unit is implemented in dedicated hardware, since this may allow the unit to cause the gater 12 to pass messages as quickly as possible. The units shown in FIG. 3 may each be implemented as distinct hardware or software units, or multiple ones of the units may be combined into a single unit.

Different buses use different message protocols. It is efficient if as much as possible of the supervisory unit may be generalized so that the supervisory unit may work with any bus protocol. This may reduce the need to redesign sections of the system for different applications. In one arrangement, the mapper and the gater, and optionally parts of the filter and action units, may be specific to a particular bus protocol, and the other functional parts of the system may operate independently of which bus protocol is being used.

The supervisory unit is intrusive, in that the supervisory unit is interposed in the communications path between the processor core and the bus. The gater may include a multi-bit latch that stores the bus message when the bus message is received, and may be triggered to then release the message to the bus or to a recipient such as a processor or a memory device. The message may be stored in other ways while the system decides what action to take with respect to the message.

The examples given above focus on embodiments in which the gater and the associated filtering and action-determining units act on communications from a processor to a memory. However, the supervisory unit may operate in other ways. The supervisory unit may act on communications from a bus to a processor, or on communications in both directions. The supervisory unit may act on communications between a bus and another device such as memory. Such communications may be to and/or from the bus.

The supervisory unit may support filtering on at least the address phase and the data phase of a bus transaction. In a typical bus protocol, there may be no advantage in the supervisory unit filtering on a response phase, as this may be too late for useful action to be taken to block or alter the bus transaction.

A supervisory unit of the type described above may help to improve the security of a system (e.g., by applying filter rules that detect insecure transactions, such as attempts to access unauthorized areas of memory and/or profile of accesses to regions of the system, and then blocking or modifying such transactions). A supervisory unit of the type described above may help to improve the integrity of a system (e.g., by applying filter rules that detect invalid or erroneous bus access requests, such as a request to read from a non-existent location).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A supervisory unit in a Network-on-Chip (NoC), the supervisory unit being configured to supervise messages passing between a bus and a data processor core, the supervisory unit being configured to, on receiving a bus message:
   store the bus message in a data store;
   compare the bus message to predetermined filter criteria in a filter unit, the filter unit being preconfigured with a set of bus message patterns that are to be subject to actions, the set of bus message patterns being defined to aid security, integrity, or security and integrity of the data processor core, or aid debugging of software running on the data processor core;
   select, in dependence on the comparison, one or more actions to be taken with respect to the bus message, the one or more actions being selected from the group comprising: permitting the bus message to pass unaltered, blocking the bus message from passing, and permitting the bus message to pass in an altered state; and
   perform the selected one or more actions with respect to the bus message.

2. The supervisory unit of claim 1, wherein the data store is a multi-bit latching unit implemented in hardware located in a communication path for bus messages between the bus and a participant in a bus protocol in accordance with which the bus operates.

3. The supervisory unit of claim 2, wherein the supervisory unit is further configured to perform the one or more actions by signaling the latching unit to release or delete a respective bus message.

4. The supervisory unit of claim 1, wherein the supervisory unit comprises an external communications interface distinct from the bus, and the group further comprises transmitting a message over the external communications interface.

5. The supervisory unit of claim 1, wherein the bus operates in accordance with a bus protocol, and the supervisory unit comprises:
   a comparison function configured to perform the comparing; and
   a translation function configured to:
      translate the bus message from a format in accordance with the bus protocol to a translated message in a second format not in accordance with the bus protocol; and
      provide the translated message as input to the comparison function.

6. The supervisory unit of claim 1, wherein the group further comprises changing the predetermined filter criteria.

7. The supervisory unit of claim 1, wherein the supervisory unit comprises an external communications interface distinct from the bus, and the supervisory unit is configured to permit the predetermined filter criteria to be changed in response to commands received by the supervisory unit over the external communications interface.

8. The supervisory unit of claim 1, wherein the supervisory unit is implemented in dedicated hardware.

9. The supervisory unit of claim 1, wherein the supervisory unit is configured to supervise bus messages passing to the bus from the data processor core.

10. The supervisory unit of claim 1, wherein at least one of the predetermined filter criteria defines a bus message associated with a security, integrity risk, or the security and the integrity risk, and the supervisory unit is configured to, on identification of a match between the at least one predetermined filter criteria and a bus message, take the action of blocking the bus message from passing or permitting the bus message to pass in the altered state.

11. The supervisory unit of claim 1, wherein the bus is a memory bus.

12. The supervisory unit of claim 1, wherein the selected one or more actions comprise permitting the bus message to pass in an altered state.

* * * * *